US011597677B2

(12) United States Patent
Luan et al.

(10) Patent No.: US 11,597,677 B2
(45) Date of Patent: Mar. 7, 2023

(54) WOOL SURFACE TREATED WITH HYDROPHOBIC AGENT AND ACOUSTIC PANELS MADE THEREFROM

(71) Applicant: USG INTERIORS, LLC, Chicago, IL (US)

(72) Inventors: Wenqi Luan, Kildeer, IL (US); Martin Brown, Gurnee, IL (US); Qing Yu, Libertyville, IL (US); Scott A. Bogen, Ellsworth, WI (US); Carlos Figi, River Falls, WI (US)

(73) Assignee: USG INTERIORS, LLC, Chicago, IL (US)

( * ) Notice: Subject to any disclaimer, the term of this patent is extended or adjusted under 35 U.S.C. 154(b) by 105 days.

(21) Appl. No.: 15/606,333

(22) Filed: May 26, 2017

(65) Prior Publication Data
US 2018/0339935 A1    Nov. 29, 2018

(51) Int. Cl.
| C03C 13/06 | (2006.01) |
| C04B 14/48 | (2006.01) |
| C03C 25/26 | (2018.01) |
| C04B 30/02 | (2006.01) |
| C04B 26/28 | (2006.01) |
| G10K 11/162 | (2006.01) |
| C04B 111/52 | (2006.01) |

(52) U.S. Cl.
CPC .............. *C03C 13/06* (2013.01); *C03C 25/26* (2013.01); *C04B 14/48* (2013.01); *C04B 26/28* (2013.01); *C04B 30/02* (2013.01); *G10K 11/162* (2013.01); *C04B 2111/52* (2013.01)

(58) Field of Classification Search
CPC ......... C04B 14/18; C04B 14/46; C04B 18/24; C04B 40/0064; C04B 14/48; C04B 26/28; C04B 30/02; C04B 20/1051; C04B 24/38; C04B 2111/52; C03C 13/06; C03C 25/26; G10K 11/162
See application file for complete search history.

(56) References Cited

U.S. PATENT DOCUMENTS

| 1,769,519 | A | | 7/1930 | King et al. | |
| 1,940,975 | A | * | 12/1933 | Shaver | C03B 37/06 65/506 |
| 1,996,082 | A | * | 4/1935 | Powell | D21H 13/40 162/152 |
| 2,019,021 | A | * | 10/1935 | O'Brien | C03C 25/255 427/220 |
| 2,020,403 | A | | 11/1935 | Engle | |
| 2,022,750 | A | * | 12/1935 | Toohey | C03B 37/06 65/447 |
| 2,163,567 | A | * | 6/1939 | Gregory | C04B 26/22 252/62 |
| 3,155,533 | A | * | 11/1964 | Schaschl | C03C 25/40 428/392 |
| 3,257,182 | A | * | 6/1966 | Nyström | C03B 37/05 65/519 |
| 4,720,295 | A | | 1/1988 | Bronshtein | |
| 5,709,728 | A | | 1/1998 | Fleckenstein et al. | |
| 5,792,711 | A | | 8/1998 | Roberts | |
| 5,911,818 | A | | 6/1999 | Baig | |
| 6,077,798 | A | * | 6/2000 | Rapp | C03C 13/06 501/36 |
| 6,299,727 | B1 | * | 10/2001 | Hatanaka | C04B 14/386 162/125 |
| 7,223,455 | B2 | * | 5/2007 | Ruid | B32B 5/26 138/137 |
| 7,226,522 | B2 | | 6/2007 | Perander et al. | |
| 8,142,856 | B2 | | 3/2012 | Chevalier | |
| 9,562,150 | B2 | | 2/2017 | Jaffrennou et al. | |
| 2004/0177650 | A1 | * | 9/2004 | Noack | C03C 1/002 65/134.8 |
| 2009/0011251 | A1 | | 1/2009 | Englert et al. | |
| 2009/0042030 | A1 | | 2/2009 | Douce et al. | |
| 2009/0311936 | A1 | * | 12/2009 | Espiard | C04B 20/12 442/378 |
| 2012/0168054 | A1 | | 7/2012 | Chen et al. | |

(Continued)

FOREIGN PATENT DOCUMENTS

| CN | 1606535 A | 4/2005 |
| CN | 101223117 A | 7/2008 |
| CN | 104563316 A | 4/2015 |

(Continued)

OTHER PUBLICATIONS https://patents.google.com/patent/CN102942351B/en?oq=cn102942351 (Year: 2013).*

(Continued)

*Primary Examiner* — Arti Singh-Pandey

(74) *Attorney, Agent, or Firm* — Marshall, Gerstein & Borun LLP

(57) ABSTRACT

A method of preparing a fibrous panel including surface treating a mineral wool with a water repellent agent to provide a water-repellent surface treated mineral wool, admixing the water-repellent surface-treated mineral wool with water to provide a slurry, and dewatering and drying the slurry to provide a fibrous panel. A method of preparing a mineral wool having a surface treated with a water repellent agent including contacting a water repellent agent emulsion with a mineral wool and drying the mineral wool, and a method of preparing a water-repellent surface-treated fibrous panel including mineral wool having a surface pre-treated with a water repellent agent are also provided.

16 Claims, No Drawings

(56) References Cited

U.S. PATENT DOCUMENTS

2012/0285643 A1    11/2012  Yu
2014/0004766 A1*   1/2014  Forte .................... E04B 1/7662
                                                        442/414

FOREIGN PATENT DOCUMENTS

| EP | 1868952 A2 | 12/2007 |
|----|------------|---------|
| GB | 1181346 A | 2/1970 |
| JP | S57-190165 U | 12/1982 |
| JP | S59-94520 A | 6/1984 |
| JP | H0797249 A | 4/1995 |
| JP | 2012-528498 A | 11/2012 |
| RU | 2460700 C2 | 9/2012 |

OTHER PUBLICATIONS

International Application No. PCT/US2018/034131, International Search Report and Written Opinion, dated Aug. 29, 2018.
Russian Patent Application No. 2019138781, Search Report, dated Sep. 24, 2021.
Japanese Patent Application No. 2019-562550, Notification of Reasons for Refusal, dated Aug. 30, 2022.
Notice of Opposition filed in European Patent Application No. 18734330.6, dated Sep. 8, 2022.
Japanese Patent Application No. 2019-562550, Notification of Reasons for Refusal, dated Apr. 12, 2022.
Chinese Patent Application No. 2018800316104, Office Action, dated Oct. 22, 2021.

* cited by examiner

WOOL SURFACE TREATED WITH HYDROPHOBIC AGENT AND ACOUSTIC PANELS MADE THEREFROM

FIELD OF THE INVENTION

The disclosure relates generally to wool surface treated with a hydrophobic agent. More particularly, the disclosure relates to a method of surface treating wool with a hydrophobic agent, a method of forming an acoustic panel including the surface-treated wool, and acoustic panels including the surface treated wool.

BACKGROUND

Acoustical panels (or tiles) are specifically designed systems that are intended to improve acoustics by absorbing sound and/or reducing sound transmission in an indoor space, such as a room, hallway, conference hall, or the like. Although there are numerous types of acoustical panels, a common variety of acoustical panel is generally composed of mineral wool fibers, fillers, colorants, and binders, as disclosed, for example, in U.S. Pat. No. 1,769,519. These materials, in addition to a variety of others, can be employed to provide acoustical panels with desirable acoustical properties and other properties, such as color and appearance.

Fibrous panels, such as the base mats for traditional ceiling tiles and acoustical panels are typically made using a wet forming process. The components that will make up the fibrous panel, such as the mineral wool, fillers, colorants, and binders are mixed in water to form a dispersion and then flowed onto a moving support wire screen, such as that of a Fourdrinier machine to form green board. The green board is then dewatered and dried in a heated convection oven to form the lightweight base mat of an acoustical panel. Drying in the heated convection drying oven typically is the production limiting step, as well as the most costly production step.

Acoustical performance of acoustic tiles is characterized by noise reduction coefficient (NRC) and ceiling attenuation class (CAC) value. The NRC is a measure of sound absorption and can be determined according to ASTM C423. The NRC value is an average of four sound absorption coefficients of the particular surface at frequencies of 250 HZ, 500 HZ, 1000 HZ and 2000 HZ, which cover the range of typical human speech. NRC is represented by a number between 0 and 1.00, which indicates the fraction of sound reaching the panel that is absorbed. An acoustical panel with an NRC value of 0.60 absorbs 60% of the sound that strikes it and deflects 40% of the sound. Another test method is estimated NRC ("eNRC"), which uses an impedance tube as described in ASTM C384. The ability to reduce sound transmission is measured by the values of Ceiling Attenuation Class ("CAC") as described in ASTM E1414. CAC value is measured in decibels ("dB"), and represents the amount of sound reduction when sound is transmitted through the material. For example, an acoustical panel with a CAC of 40 reduces transmitted sound by 40 decibels. Similarly, sound transmission reduction can also be measured by its Sound Transmission Class ("STC") as described in ASTM E413 and E90. For example, a panel with an STC value of 40 reduces transmitted sound by 40 decibels.

SUMMARY

One aspect of the disclosure provides a method of preparing a fibrous panel including surface treating a mineral wool with a water repellent agent to provide a water-repellent surface treated mineral wool, admixing the water-repellent surface-treated mineral wool with water to provide a slurry, and dewatering and drying the slurry to provide a fibrous panel.

Another aspect of the disclosure provides a method of preparing a mineral wool having a surface treated with a water repellent agent including contacting a water repellent agent emulsion with a mineral wool and drying the mineral wool.

Another aspect of the disclosure provides a water-repellent surface-treated fibrous panel including mineral wool having a surface pre-treated with a water repellent agent.

Further aspects and advantages will be apparent to those of ordinary skill in the art from a review of the following detailed description. While the methods and compositions are susceptible of embodiments in various forms, the description hereafter includes specific embodiments with the understanding that the disclosure is illustrative, and is not intended to limit the disclosure to the specific embodiments described herein.

DETAILED DESCRIPTION

The disclosure provides a method of preparing a fibrous panel including surface treating a mineral wool with a water repellent agent to provide a water-repellent surface-treated mineral wool, admixing the water-repellent surface-treated mineral wool with water to provide a slurry, and dewatering and drying the slurry to provide a fibrous panel. In embodiments, surface-treating the mineral wool includes providing the water repellent agent in an amount in a range of about 0.01% to about 0.20% by weight, based on the weight of the mineral wool. In embodiments, surface treating the mineral wool includes contacting a water repellent agent emulsion with the mineral wool and drying the mineral wool. In embodiments, the water repellent agent comprises at least one of polydimethylsiloxane, polymethylhydrogensiloxane, and a combination thereof.

As used herein, "water repellent agent" refers to an agent that provides the mineral wool with a hydrophobic surface and inhibits wetting of the mineral wool by aqueous or polar solvents.

As used herein, "a water repellent surface-treated mineral wool" refers to a mineral wool that has been previously treated with a water-repellent agent such that the mineral wool includes a coating of water-repellent agent adhered to a surface of the mineral wool. The water repellent surface-treated mineral wool can include a partial, non-continuous coating of water-repellent agent or a substantially continuous coating of water-repellent agent.

The disclosure further provides a method of preparing a mineral wool having a surface treated with a water repellent agent including contacting a water repellent agent emulsion with a mineral wool and drying the mineral wool. In embodiments, the water repellent agent is provided on the surface of the mineral wool in an amount in a range of about 0.01% to about 0.20% by weight, based on the weight of the treated mineral wool. In some embodiments, the contacting includes spraying a water repellent agent emulsion into a cupola collection chamber. In embodiments, the contacting includes cooling the mineral wool and coating the mineral wool with the water repellent agent. In some embodiments, the water repellent agent comprises at least one of polydimethylsiloxane, polymethylhydrogensiloxane, and a combination thereof.

The disclosure further provides a fibrous panel including a water repellent surface-treated mineral wool having a surface pre-treated with a water repellent agent. In embodiments, the fibrous panel further comprises starch. In embodiments, the mineral wool is surface coated with about 0.01% to about 0.20% by weight water repellent agent, based on the total weight of the treated mineral wool. In embodiments, the panel is characterized by about a 50 lbs/thousand square feet (MSF) decrease in water holding relative to an equivalent fibrous panel wherein the mineral wool was not surface treated with the water repellent agent. Optionally, the panel is characterized by about a 100 lbs/MSF decrease in water holding relative to an equivalent fibrous panel wherein the mineral wool was not surface treated with the water repellent agent.

"Equivalent fibrous panel" when used herein includes a modifier, typically, "wherein the mineral wool has not been surface treated with a water repellent agent." As used herein "equivalent fibrous panel" means that the composition of the fibrous panel is the same as a second fibrous panel, to which the first is being compared, and/or the process of preparing the fibrous panel is the same as a second fibrous panel, with the exception of the noted modified condition.

In embodiments, the water repellent agent comprises at least one of polydimethylsiloxane, polymethylhydrogensiloxane, and a combination thereof. In embodiments, the panel has an eNRC value increase of at least about 0.05 relative to an equivalent fibrous panel wherein the mineral wool was not surface treated with the water repellent agent. In embodiments, the panel is characterized by including a wool fiber having an increase in water bulking of about 40% to about 50%, relative to the water bulking of a wool fiber of an equivalent fibrous panel wherein the mineral wool was not surface treated with a water repellent agent.

The water repellent surface treated mineral wool and fibrous panels including surface treated mineral wool disclosed herein have one or more advantages, including, providing a fibrous panel with decreased density and corresponding improved acoustic properties, providing a fibrous panel having improved water bulking properties, providing a fibrous panel that has improved water holding properties and corresponding improved drying times and/or the water repellent agent can supplement a mineral fiber dedusting agent such as polyethylene glycol, which provides industrial hygiene, but no useful properties to the final fibrous panel.

Method of Preparing a Surface-Treated Mineral Wool

The method of preparing a water repellent surface-treated mineral wool of the disclosure, i.e., a mineral wool having a surface treated with a water repellent agent, generally includes contacting a water repellent agent emulsion with a mineral wool and drying the mineral wool.

Mineral wool is comprised of fibers of inorganic raw materials. Mineral wool is a term broadly applied to various related vitreous products. In general, mineral wool is a fiberglass-like material composed of very fine, interlaced mineral fibers, somewhat similar in appearance to loose wool. It is composed primarily of silicates of calcium and aluminum, chromium, titanium, and zirconium. Typically, mineral wool is produced from natural rock or slag. Slag is a term broadly applied to refer to waste products of the primary metal and foundry industries, including deposits from the furnace lining charge impurities, ash from fuel, and fluxes used to clean the furnace and remove impurities. Generally speaking, although mineral fibers have an appearance that is similar to that of glass fibers, their chemical composition is significantly different from that of glass fibers due to the high content of iron and calcium and magnesium and a relatively low proportion of silicon dioxide and aluminum.

Conventional techniques of preparing mineral wool are described in U.S. Pat. Nos. 2,020,403; 4,720,295; and 5,709,728, all of which are incorporated by reference. Regular wool fabrication involves melting the raw materials, such as slag, basalt, and/or granite, with coke and in the presence of oxygen in a suitable furnace, such as a cupola, and heating the composition to a temperature in the range of 1,400° C. to 2,000° C. The methods disclosed herein are not limited to a cupola type furnace. Other furnaces, such as an electric furnace or a submerged combustion melting furnace would work just as well. Material used in a cupola requires specific product sizing to allow proper bed breathing and combustion air flow. Electric furnaces or submerged combustion melting furnaces accommodate materials that are any size, down to the size of grains of sand. Typical cupola sizing would be 7.5-10 cm (3-4 inches)/10-15 cm (4-6 inches). The melt is then spun into wool in a fiberizing spinner via a continuous air stream.

The contacting of the water repellent agent emulsion with the mineral wool is not particularly limited. In some embodiments, mineral wool fibers that are first prepared, for example, in a cupola, are then removed from the cupola, cooled, and contacted with the water repellent agent. The cooled fibers can be contacted with the water repellent agent by soaking the wool in a diluted water repellent agent emulsion followed by drying in an oven to promote adhesion of the water repellent agent to the fibers. The wool can be soaked in the diluted water repellent agent for a period of time sufficient to allow the water repellent agent to adhere to the fibers. For example, the wool can be soaked in a diluted water repellent agent emulsion for at least about 10 minutes. Typically the wool is dried at a temperature of about 100° C. or greater, about 150° C. or greater, about 200° C. or greater or about 250° C. or greater, so long as the drying temperature is lower than the flash temperature of the water-repellant agent to avoid burn-out. In some embodiments, the contacting takes place after spinning the melt into fibers and prior to cooling the wool fibers. For example, the water repellent agent emulsion can be pumped into a cupola collection chamber through a spray nozzle, which allows the emulsion to atomize and coat the wool fibers, thereby simultaneously coating and cooling the fibers. The water repellent emulsion solution for spraying into a cupola collection chamber can have a concentration of water repellent in a range of about 2.5% to about 20% by weight, or about 5% to 10% by weight, for example about 2.5%, about 5%, about 7.5%, about 10%, about 12.5%, about 15%, about 17.5%, or about 20% by weight. In general, if the concentration of water repellent agent in the emulsion solution is less than about 2.5%, the bulking property of the resulting wool is not improved. Further, if the concentration of water repellent agent in the emulsion solution is greater than about 20%, the efficiency of the wool surface treatment is unacceptably low and the total hydrocarbon (THC) emission value of the resulting fiber panels are unacceptably high. The flow rate of the water repellent emulsion through the spray nozzle can be in a range of about 5 gph to about 40 gph, or about 7.5 gph to about 30 gph, or about 10 gph to about 25 gph. In general, when the flow rate is outside of the range of about 5 gph to about 40 gph, the efficiency of the wool surface treatment is unacceptably low.

The water-repellent agent can be any hydrophobic agent such that the surface treated wool is not easily wetted by water, providing a fibrous panel having fibers that are more independent and well dispersed when in contact with water, for example, in an aqueous slurry used to prepare fibrous panels. Suitable water repellent agents generally include hydrophobic materials having flash temperatures high enough to avoid burn-out at drying temperatures (e.g., at temperatures of about 150° C. or greater or 250° C. or greater) in combination with low emissions, even upon heating. Example water repellent agents include, but are not limited to polydimethylsiloxane, polymethylhydrogensiloxane, and a combination thereof.

The water repellent agent can be added to the mineral wool fibers in a range of about 0.01% to about 1.00% by weight, based on the weight of the mineral wool, for example in a range of about 0.01% to about 0.25%, or about 0.01% to about 0.20%, or about 0.02% to about 0.1%, or about 0.03% to about 0.09%, or about 0.04% to about 0.09%, or about 0.01% to about 0.80%, or about 0.01% to about 0.60%, or about 0.01% to about 0.40%, or about 0.10% to about 0.50%, or about 0.3% to about 0.75%, or about 0.40% to about 0.60%, or about 0.50% by weight, based on the weight of the mineral wool fibers. As the amount of water repellent agent adhered to the fibers increases, the density of the resulting fibrous panel decreases and the eNRC value of the fibrous panel increases, indicating a more porous mat structure, and the water holding value of the fibrous panel decreases, resulting in a significant energy saving during processing as less water remains to be driven off in the convection dryer. At higher levels of incorporation, for example, about 0.10% to 0.45% by weight, or greater, based on the weight of the treated mineral wool, the physical properties of the fibrous panel, such as the hardness, MOR and MOE values can be negatively affected, relative to an equivalent fibrous panel including mineral wool that was not treated with a water repellent agent. The decrease in strength can be compensated for by increasing the amount of starch in the fibrous panel. Thus, in some embodiments, the fibrous panel further comprises starch. As the amount of water repellent agent decreases, the amount of total hydrocarbon (THC) emissions as a result of the water repellent agent decreases. Accordingly, to balance acoustic properties, strength properties, and environmental concerns, the water repellent agent can be added in an amount in a range of about 0.01% to about 1.00%, or about 0.01% to about 0.20% by weight, based on the weight of the mineral wool. The amount of water repellent agent provided on the fibers can be determined by the loss of ignition (LOI), which is the mass loss percentage when samples are exposed to a 1000° F. (~538° C.) oven for one hour.

The mineral wool may further be contacted with a dedusting agent to improve industrial hygiene. The dedusting agent generally is a hydrophilic agent that provides no advantageous properties to the final fibrous panel. The dedusting agent can be partially supplemented or fully replaced by the water repellent agent. Further, in embodiments that include both a dedusting agent and a water repellent agent, the dedusting agent can be applied to the mineral wool prior to, concurrently with, or after the contacting of the water repellent agent emulsion with the mineral wool. By supplementing or replacing the dedusting agent with the water repellent agent, industrial hygiene can be achieved with a reduced amount of an agent that provides no benefit to the final panel. In contrast, the use of the water repellent in combination with the dedusting agent or in place of the dedusting agent allows for the preparation of a final fibrous panel that has advantageous density and/or water holding properties.

Methods of drying mineral wool are well known in the art and can include, for example, drying in a convection oven.

Method of Preparing a Fibrous Panel

A fibrous panel including mineral wool surface treated with a water repellent agent can be prepared generally by surface treating a mineral wool with a water repellent agent to provide a water-repellent surface-treated mineral wool, admixing the water-repellent surface-treated mineral wool with water to provide a slurry, and dewatering and drying the slurry to provide a fibrous panel.

Water-repellent surface-treated mineral wool can be prepared as described previously. In general, surface treating the mineral wool with a water repellent agent is a step independent of and preceding preparing the slurry. Accordingly, in some embodiments, the slurry prepared by admixing the surface-treated mineral wool with water is substantially free of additional water repellent agent, i.e., of water repellent agent not introduced by addition of the pre-treated mineral wool. As used herein, "substantially free of water repellent agent," when used to describe a slurry, means that the slurry does not contain significant amounts of water repellent agents. Thus, incidental or background quantity of water repellent agents (e.g., less than about 100 ppb), may be present in the slurry (e.g., that leached off of the surface-treated mineral wool) and be within the scope of the disclosure.

Admixing of mineral wool with water to prepare a slurry is well known in the art. The admixing of the surface-treated mineral wool with water is not particularly limited as long as the components of the slurry are homogenously distributed. Other fibrous panel components, including but not limited to fillers, colorants, and binders can be admixed with the surface-treated mineral wool and water. When other components are included, such components can be admixed concurrently with the mineral wool or can be mixed with the water prior to or subsequent to addition of the surface-treated mineral wool.

Suitable fillers can include a light-weight inorganic aggregate of exfoliated or expanded glass origin, including, but not limited to expanded perlite, vermiculite, expanded vermiculite, clay, exfoliated clay, and pumice, or the mineral aggregate may be a higher density mineral aggregate, including, but not limited to, stucco (calcium sulfate hemihydrate), gypsum, and limestone.

The binder may include one or more of starch, latex, and reconstituted paper products. A combination of starch and reconstituted paper products has been found to provide useful properties, but of course other binder components and/or combinations can be used. Organic binders, such as starch, are often the primary component providing structural adhesion of the resulting fibrous panel. Starch is a preferred organic binder because, among other reasons, it is relatively inexpensive. Typical starches include unmodified starches, including, but not limited to, unmodified corn starch. Cellulosic fibers, an example of an organic fiber, act as structural elements of the final fibrous panel. Cellulosic fibers are typically provided in the form of recycled newsprint. Over Issued Newspaper (OIN) and Old Magazine (OMG) may be used in addition to or as an alternative to newsprint.

Acoustical panels can be prepared using the slurry of the disclosure according to, for example, a wet felted production process. One version of this process is described in U.S. Pat. No. 5,911,818, herein incorporated by reference in its entirety. In general, an aqueous slurry is delivered onto a moving foraminous wire of a Fourdrinier-type mat forming machine. The slurry is initially dewatered by gravity and then further dewatered by means of vacuum suction. The resulting dewatered slurry is then dried in a heated oven or kiln to remove residual moisture and form dried base mats. The drying step is generally the most time consuming and costly step of base mat production. As the dewatered slurry may take hours to dry in the oven or kiln, the amount of fibrous panels produced is limited by how many can be dried. Accordingly, the more water that can be removed during the gravity dewatering step and/or the less water that is originally incorporated into the slurry, the less time the dewatered slurry will need in the oven to dry, the less costly the fibrous panels will be to produce, and the number of fibrous panels produced can advantageously be increased.

The dewatered slurry may be dried at any suitable temperature. In embodiments, the dewatered slurry may be dried at a temperature of about 300° F. (about 150° C.) to about 600° F. (about 315° C.), about 400° F. (about 205° C.) to about 600° F. (about 315° C.), or about 450° F. (about 230° C.) to about 550° F. (about 290° C.), for example, about 300° F., about 250° F., about 400° F., about 450° F., about 500 ° F., about 550° F., or about 600° F.

Panels of acceptable size, appearance and acoustic properties are obtained by finishing the dried base mat. Finishing includes surface grinding, cutting, perforation, fissuring, roll/spray coating, edge cutting and/or laminating the panel onto a scrim, screen, or veil.

Fibrous Panel

The fibrous panel including a water repellent surface-treated mineral wool of the disclosure, i.e., a mineral wool having a surface pre-treated with a water repellent agent can be prepared using the methods disclosed herein. The fibrous panel can be characterized using a number of features including, but not limited to, density (porosity), acoustic properties (NRC and CAC values), physical properties (hardness, modulus of elongation (MOE) values, modulus of rupture (MOR) values), THC emissions, water bulking values of the wool fiber, and water holding values which are related to the time and energy needed for drying the fibrous panel.

In general, the density of the fibrous board decreases with increased amounts of water repellent agent provided on the mineral wool fibers. Without intending to be bound by theory, it is believed that as a result of the repulsive forces between the surface treated mineral wool and the water of the slurry, the mineral wool fibers disperse in the slurry such that each fiber is spaced further from other fibers, relative to the behavior of fibers that have not been surface treated. It is believed that the increase in spacing carries over to the dewatered slurry and ultimately the dried fibrous panel such that the pore sizes in the fibrous panel according to the disclosure are larger than the pore sizes resulting from untreated wool, such that the density of the fibrous panel according to the disclosure is lower than the density of an equivalent board prepared from untreated wool. In some embodiments, the density of the fibrous panel according to the disclosure is maintained relative to an equivalent fibrous panel wherein the mineral wool was not surface treated. In some embodiments, the density of the fibrous panel according to the disclosure is decreased relative to an equivalent fibrous panel wherein the mineral wool was not surface treated. In embodiments, the fibrous panel of the disclosure can be characterized by a decrease in density in a range of about 0.4-0.6 pounds per cubic foot (pcf) relative to an equivalent fibrous panel wherein the mineral wool was not surface treated.

In general, the acoustic properties of the fibrous panel are affected by the porosity and density of the fibrous panel. For example, the Noise Reduction Coefficient ("NRC") indicates the fraction of sound reaching the panel that is absorbed. An acoustical panel with an NRC value of 0.60 absorbs 60% of the sound that strikes it and deflects 40% of the sound. NRC can be estimated method is estimated NRC ("eNRC"), using an impedance tube as described in ASTM C384. The eNRC increases with increased porosity and decreased density of the fibrous panel. Thus, if a high NRC is desired, a porous, low density board can be provided. In embodiments, the fibrous panel of the disclosure is characterized by an increase in eNRC value of at least 0.05, for example about 0.05, about 0.06, about 0.07, or about 0.08, relative to an equivalent fibrous panel wherein the fibers have not been surface treated. In some embodiments the fibrous panel of the disclosure is characterized by an increase in eNRC values of about 10% to about 20% based on the eNRC value of an equivalent fibrous panel wherein the mineral wool was not surface treated.

Physical properties of fibrous panels used to characterize the strength of the panel include, for example, hardness values, MOE values, and MOR values. The strength of a fibrous panel is generally inversely related to the density, relative to an equivalent fibrous panel having the same composition but a different density. The loss of strength due to loss of density can be compensated for by including starch (or additional starch) in the fibrous panel composition.

THC emission values for fibrous panels depend on the composition of the fibrous panels. The THC emission value for fibrous panels including the surface-treated mineral wool of the disclosure is directly proportional to the amount of water repellent agent applied to the mineral wool. For example, for a fibrous panel of the disclosure including mineral wool having a surface pre-treated with a water repellent agent in a range of about 0.25% to about 1.0% by weight, based on the weight of the mineral wool, can have THC emissions of about 5% to about 25% higher than the THC emissions of an equivalent fibrous panel wherein the mineral wool has not been treated with a water repellent agent. In contrast, for a fibrous panel of the disclosure including mineral wool having a surface pre-treated with a water repellent agent in a range of about 0.01% to about 0.09% by weight, based on the weight of the mineral wool, can have THC emissions of about 1% to about 12% less than the THC emissions of an equivalent fibrous panel wherein the mineral wool has not been treated with a water repellent agent.

The water holding value of a fibrous panel relates to the amount of water retained after dewatering the slurry. The higher the water holding value, the more water that must be removed during drying to form the fibrous panel. Without intending to be bound by theory, it is believed that because the mineral wool treated with a water repellent agent has decreased wettability relative to mineral wool that has not been treated with a water repellent agent, the adhesive forces between the fibers of the surface-treated mineral wool and water is decreased and the fibers retain less water during the dewetting process. The fibrous panel including mineral wool having a surface pre-treated with a water repellent agent can be characterized by at least about a 25 lbs/MSF, at least about a 50 lbs/MSF, at least about a 75 lbs/MSF, or at least about a 100 lbs/MSF water holding value, relative to an equivalent fibrous panel wherein the mineral wool was not surface treated with a water repellent agent. In embodiments, the panel of the disclosure is characterized by about a 50 lbs/MSF decrease in water holding relative to an equivalent fibrous panel wherein the mineral wool was not surface treated with the water repellent agent. Optionally, the panel of the disclosure is characterized by about a 100 lbs/MSF decrease in water holding relative to an equivalent fibrous panel wherein the mineral wool was not surface treated with the water repellent agent.

The fibrous panels of the disclosure can also be characterized by a water bulking value of the wool fibers included in the panel. In general, the higher the water bulking value, the more disperse the mineral wool fibers are in the slurry and the lower the density of the resulting fibrous panel. The fibrous panels of the disclosure can be characterized by a wool fiber water bulking of at least a 30%, at least a 40%, at least a 45%, or at least a 50% increase in water bulking relative to the wool fibers provided in an equivalent fibrous panel where the mineral wool was not treated with a water repellent agent.

Determination of Water Bulking Value

The water bulking value is generally determined as follows. 50 grams of wool is mixed with 950 grams of water and the mixture is agitated for 10 minutes. The resulting slurry is immediately poured into a 1000 ml graduated cylinder and allowed to settle for 10 minutes. The volume reading (in ml) of the wool slurry after the 10 minute settle period represents the bulking value.

Determination of ENRC Value

The eNRC value is an estimated Noise Reduction Coefficient that is determined by the impedance tube test method. Briefly, the standard test method for impedance and absorption of acoustical materials, detailed in ASTM E1050-98, uses a tube, two microphones and a digital frequency analysis system. The results include spectral results of 250 Hz, 500 Hz, 1000 Hz, and 2000 Hz, and an arithmetic average value of the four frequencies indicates the eNRC of the acoustical material.

Determination of Water Holding Value

The water holding value is the total water weight held in the wet board (i.e., dewatered slurry) prior to oven drying, per 1000 square feet surface area of board product. The water holding value is determined by subtracting from the total wet board weight/1000 square feet surface area the weight of the dried board/1000 square feet board surface area.

Determination of MOR Value and Hardness Value

The MOR and Hardness values are determined according to ASTM C367 using an Instron machine, or equivalent. Briefly, test specimen are about 3" wide and 10" long. The supporting surface span is about 8". The load was applied at the center of the specimen at a crosshead speed of about 1.97 in/min until a failure occurred. The Modulus of Rupture is calculated according to the equation:

$$MOR=3PL/(2bd^2)$$

wherein P is the maximum load in lbf, L is the length of span in inches, b is the specimen width in inches, and d is the specimen thickness in inches.

The panels and methods in accordance with the disclosure can be better understood in light of the following examples, which are merely intended to illustrate the panels and methods of the disclosure and are not meant to limit the scope thereof in any way.

EXAMPLES

Example 1

Mineral wool was surface treated with a linear polydimethylsiloxane by soaking the wool in a diluted solution of polydimethylsiloxane emulsion. In particular, 0.625 and 2.50 grams of the linear polydimethylsiloxane emulsion were each mixed with 2000 grams of water and 250 grams of wool, to provide emulsion solutions having concentrations of linear polydimethylsiloxane of about 0.031% and about 0.125% by weight. Untreated mineral wool was fully soaked in the emulsion solutions for 10 minutes. The treated mineral wools were dried in an oven at 240° F. (~116° C.) for about 4 hours. The treated wools were tested to determine loss of ignition (LOI) determine the amount of water repellent agent adhered on the wool surface. The treated wools had an amount of water repellent agent of about 0.13% and 0.45%, by weight, adhered on the wool surface.

The treated mineral wools were used to prepare fibrous panels. In particular, the mineral wools were admixed with perlite, starch, newspaper and water to form a homogeneous slurry. The slurry was dewatered using a Tappi former. The resulting dewatered slurries were dried in a 500° F. (260° C.) oven for one hour and a 300° F. (149° C.) oven for 3 hours to form fibrous panels (Treated Panels #1). A control fibrous panel (Control Panel #1) having the same composition as Treated Panels #1 was prepared under the same conditions as Treated Panels #1, except that the mineral wool was not surface treated with the linear polydimethylsiloxane. The fibrous panels were tested for board density, eNRC, hardness, MOR and MOE, water holding value, and THC emissions.

The average densities of fibrous panels prepared using the surface treated mineral wool (Treated Panels #1) were about 0.4 and 0.6 pcf lower than the density of the Control Panel #1, indicating a more porous mat structure. The eNRC of the Treated Panels #1 showed a corresponding improvement of about 0.08, relative to the eNRC of the Control Panel #1. However, the physical properties of the Treated Panels #1 (hardness, MOE, and MOR) were negatively affected by the density decrease. We expect that adjustment of the starch levels in the Treated Panels would compensate for the negative effect of the density decrease. The water holding value of the Treated Panels #1 was advantageously reduced by about 3.9% and about 5.8%, relative to the Control Panel #1. In particular, the Control Panel #1 had a water holding value of about 1816 lbs/MSF whereas the Treated Panels #1 had water holding values of about 1717 and 1748 lbs/MSF. The THC emissions of the Treated Panels #1 were about 5 and 25% higher than the THC emissions of the Control Panel #1.

Thus, Example 1 demonstrates successful formation of fibrous panels according to the disclosure including surface treated mineral wool prepared according to the disclosure. The fibrous panels according to the disclosure had improved acoustic properties (eNRC) and water holding properties relative to equivalent fibrous panels wherein the mineral wool was not surface treated with a water repellent agent.

Example 2

Mineral wool was prepared having a surface pre-treated with linear polydimethylsiloxane, such that the mineral wool included 0.04 or 0.09% by weight, based on the total weight of the mineral wool, post-pre-treatment. In particular, the polydimethylsiloxane emulsion was diluted with water to 7.5% and 10% polydimethylsiloxane, by weight and pumped into the cupola collection chamber through a spray nozzle at the flow rate of 25 gallons per hour. The polydimethylsiloxane emulsion solutions were atomized and vaporized to cool the fiberized wool and coat the surface thereof. The treated mineral wools were used to prepare fibrous panels. In particular, the mineral wools were admixed with perlite, starch, newspaper and water to form a homogeneous slurry. The slurries were dewatered using a Fourdrinier machine. The resulting dewatered slurries were dried in a 500° F. (260° C.) oven for one hour and a 300° F. (149° C.) oven for 3 hours to form fibrous panels (Treated Panels #2). A control fibrous panel (Control Panel #2) having the same composition as Treated Panels #2 was prepared under the same conditions as Treated Panels #2, except that the mineral wool was not surface treated with the linear polydimethylsiloxane. The fibrous panels were tested for board density, eNRC, hardness, MOR and MOE, water holding value, and THC emissions.

The average density of fibrous panels prepared using the surface treated mineral wool (Treated Panels #2) was equivalent to the density of the Control Panel #2. The eNRC of the Treated Panels #2 was consistent with the eNRC of the Control Panel #2, as expected due to the similar densities. The physical properties of the Treated Panels #2 (hardness, MOE, and MOR) were also consistent with the Control Panel #2, indicating that the physical properties of the Treated Panels #1 in Example 1 were affected by the density decrease, and not by the presence of the water repellent agent. The water holding value of the Treated Panels #2 were advantageously reduced by about 10.5% and about 11.5%, relative to the Control Panel #2. In particular, the Control Panel #2 had a water holding value of about 1944 lbs/MSF whereas the Treated Panels #2 had water holding values of about 1717 and 1745 lbs/MSF. The THC emissions of the Treated Panels #2 were about 1% and about 11% less than the THC emissions of the Control Panel #2. The water bulking of the treated wools of Treated Panels #2 showed significant improvement over the water bulking of the Control Panel #2. In particular the treated fibrous panels had wool fibers having water bulking of about 920 ml and 950 ml, compared to 650 ml for the control panels.

Thus, Example 2 demonstrates successful formation of fibrous panels according to the disclosure including surface treated mineral wool prepared according to the disclosure. The fibrous panels according to the disclosure had improved water bulking properties, water holding properties, and THC emissions relative to equivalent fibrous panels wherein the mineral wool was not surface treated with a water repellent agent.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of a conflict between the present disclosure and incorporated patents, publications, and references, the present disclosure should control.

What is claimed:

1. A method of preparing a fibrous panel comprising:
   surface treating a mineral wool with a water repellent agent to provide a water-repellent surface-treated mineral wool including a coating of water-repellent agent adhered to a surface of the mineral wool;
   admixing the water-repellent surface-treated mineral wool with water to provide a slurry; and
   dewatering and drying the slurry to provide a fibrous panel, wherein the water repellent agent is polydimethylsiloxane.

2. The method of claim 1, wherein surface treating the mineral wool includes providing the water repellent agent in an amount in a range of about 0.01% to about 0.20% by weight, based on the weight of the surface-treated mineral wool.

3. The method of claim 1, wherein surface treating the mineral wool comprises contacting a water repellent agent emulsion with the mineral wool and drying the mineral wool.

4. A method of preparing a mineral wool having a surface treated with a water repellent agent comprising:
   contacting a water repellent agent emulsion with a mineral wool to provide a mineral wool having a surface treated with a water repellent agent, the water-repellent surface-treated mineral wool including a coating of water-repellent agent adhered to a surface of the mineral wool; and
   drying the mineral wool, wherein the water repellent agent is polydimethylsiloxane.

5. The method of claim 4, wherein the water repellent agent is provided in an amount in a range of about 0.01% to about 0.20% by weight, based on the weight of the surface-treated mineral wool.

6. The method of claim 4, wherein the contacting comprises spraying a water repellent agent emulsion solution into a cupola collection chamber.

7. The method of claim 6, wherein the contacting comprises cooling and coating the mineral wool with the water repellent agent.

8. A fibrous panel, comprising water-repellent surface-treated mineral wool having a surface pre-treated with a water repellent agent, the water-repellent surface-treated mineral wool including a coating of water-repellent agent adhered to a surface of the mineral wool, wherein the water repellent agent is polydimethylsiloxane.

9. The fibrous panel of claim 8, wherein the panel further comprises starch.

10. The fibrous panel of claim 8, wherein the mineral wool is surface coated with about 0.01% to about 0.20% by weight of water repellent agent, based on the total weight of the surface-treated mineral wool.

11. The fibrous panel of claim 8, wherein the panel is characterized by about a 50 lbs/MSF decrease in water holding relative to an equivalent fibrous panel wherein the mineral wool was not surface treated with the water repellent agent.

12. The fibrous panel of claim 11, wherein the panel is characterized by about a 100 lbs/MSF decrease in water holding relative to an equivalent fibrous panel wherein the mineral wool was not surface treated with the water repellent agent.

13. The fibrous panel of claim 8, wherein the panel has eNRC value increase of at least about 0.05 relative to an equivalent fibrous panel wherein the mineral wool was not surface treated with the water repellent agent.

14. The fibrous panel of claim 8, wherein the panel is characterized by an increase in water bulking of about 40% to 50% relative to the water bulking of an equivalent fibrous panel wherein the mineral wool was not surface treated with the water repellent agent.

15. The method of claim 1, wherein the water-repellent surface-treated mineral wool is dried prior to being admixed with water to form a slurry.

16. The method of claim 15, wherein, subsequent to being dried, the water-repellent surface-treated mineral wool is admixed with water, a filler, and a binder to form the slurry.

* * * * *